(12) United States Patent
Hong et al.

(10) Patent No.: US 12,436,867 B2
(45) Date of Patent: Oct. 7, 2025

(54) MACHINE LEARNING BASED PRE-SUBMIT TEST SELECTION

(71) Applicant: SAP SE, Walldorf (DE)

(72) Inventors: Jingun Hong, Seoul (KR); Dong Won Hwang, Seoul (KR)

(73) Assignee: SAP SE, Walldorf (DE)

( * ) Notice: Subject to any disclaimer, the term of this patent is extended or adjusted under 35 U.S.C. 154(b) by 191 days.

(21) Appl. No.: 18/461,097

(22) Filed: Sep. 5, 2023

(65) Prior Publication Data

US 2025/0077386 A1    Mar. 6, 2025

(51) Int. Cl.
*G06F 9/44*        (2018.01)
*G06F 11/3604*     (2025.01)
*G06N 20/00*       (2019.01)

(52) U.S. Cl.
CPC ......... *G06F 11/3608* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 11,874,762 | B2 * | 1/2024 | Nidugala | G06F 11/3684 |
| 2017/0139819 | A1 * | 5/2017 | D'Andrea | G06F 11/3692 |
| 2022/0269401 | A1 * | 8/2022 | Lekivetz | G06F 3/04847 |
| 2023/0004486 | A1 * | 1/2023 | Drozhak | G06F 11/3692 |
| 2023/0025441 | A1 * | 1/2023 | Oguara | G06F 11/368 |
| 2023/0222051 | A1 * | 7/2023 | Priyanka | G06F 11/3608 717/126 |
| 2024/0303185 | A1 * | 9/2024 | Boué | G06N 20/00 |

OTHER PUBLICATIONS

Bagherzadeh et al., Reinforcement Learning for Test Case Prioritization, IEEE (Year: 2022).*
Martins et al., Supervised Learning for Test Suit Selection in Continuous Integration, IEEE 2021 (Year: 2021).*
An et al., FONTE: Finding Bug Inducing Commits from Failures, IEEE 2023 (Year: 2023).*
Bach et al., Testing very large database management systems: The case of SAP HANA, 2022 (Year: 2022).*

* cited by examiner

*Primary Examiner* — Insun Kang
(74) *Attorney, Agent, or Firm* — Fountainhead Law Group, PC

(57) ABSTRACT

Machine learning is used for pre-submit test selection. A commit including a new code change is obtained and a feature vector is generated based on the code change and historical test information. A ranking pre-submit tests is determined by providing the feature vector to a learning algorithm. One or more pre-submit tests are selected based on the ranking and the new code change is tested using selected tests. An assessment of the new code change is determined based on the test results, which indicate whether the new code change is accepted or rejected for submission to the source code repository. Later, new submitted source code stored in the repository is tested using a set of post-submit tests to obtain post-submit test results. Then the learning algorithm is updated based on the assessment of the new code change and the post-submit test results to obtain an updated learning algorithm.

20 Claims, 5 Drawing Sheets

MACHINE LEARNING BASED PRE-SUBMIT TEST SELECTION

BACKGROUND

The present disclosure relates to continuous integration and in particular to machine learning based pre-submit test selection.

Software systems and platforms providing continuous deployment of software deal with challenges in handling the frequent integration. To be ready for the any-time-deliverable status, it may be prerequired to maintain strong and safe continuous integration for the always-production-ready status of the software source code. This continuous integration can be comprised of a series of tests. Regression testing may generally be the most critical part of the process. This pre-submit testing, however, may not scale in its size with limitations from realistic turnaround time and computational resources for testing. And many times, this phase of testing may include integration tests that require more cost time, and resources to validate software behavior that involves other components, infrastructures, and so on.

In some large-scale software projects, regression test prioritization and selection is adapted to make continuous integration more reliable and practical. Machine Learning based test selection may be more efficient than static analysis-based test selection and may be more effective than dynamic analysis-based test selection using historical data. However, a reinforcement learning agent, like any other machine learning model, also requires "labeled" data to perform properly. In test selection, test case result history may be used as rejected test runs can be regarded as "should be selected" test cases. But not every test case may have historical records. In some cases, only a fixed set of test cases are executed as a regression test and a larger pool of test cases may be executed as post-submit tests regularly, such as daily, weekly, and so on.

One problem with this situation is that there can be faults in new source code changes that can only be detected by test cases in the larger test pool. And this cannot be used directly as training data for either the learn-to-rank models or the reinforcement learning agent to be able to catch them in the future, even if the faults are detected in the post-submit testing, because data labeling is not integrated into the continuous integration pipeline. For instance, it is not known which commit introduced a bug that caused tests in the larger test pool to fail. It would have been advantageous if that particular test had been selected to be performed on source code before it was integrated into the software.

The present disclosure addresses these issue and others, as further described below.

SUMMARY

The present disclosure provides a computer system. The computer system includes one or more processors and one or more machine-readable medium coupled to the one or more processors. The one or more machine-readable medium store computer program code comprising sets instructions. The instructions are executable by the one or more processors to obtain a commit including a new code change that that is different compared to submitted source code stored in a source code repository. The instructions are further executable to generate a feature vector based on the new code change and historical test case information, the historical test case information including information on code submissions rejected based on pre-submit tests and information on bug-inducing code changes based on post-submit tests. The instructions are further executable to determine a ranking of a plurality of pre-submit tests using a learning algorithm by providing the feature vector to the learning algorithm. The instructions are further executable to select one or more of the plurality of pre-submit tests based on the ranking to determine a set of selected pre-submit tests. The instructions are further executable to test the new code change using the set of selected pre-submit tests to obtain pre-submit test results. The instructions are further executable to determine an assessment of the new code change based on the pre-submit test results, the assessment indicating whether the new code change is accepted or rejected for submission to the source code repository. The instructions are further executable to test new submitted source code stored in the source code repository using a set of post-submit tests to obtain post-submit test results, the new submitted source code including the new code change. The instructions are further executable to update the learning algorithm based on the assessment of the new code change and the post-submit test results to obtain an updated learning algorithm.

The present disclosure provides one or more non-transitory computer-readable medium storing computer program code comprising sets of instructions to obtain a commit including a new code change that that is different compared to submitted source code stored in a source code repository. The computer program code further comprises sets of instruction to generate a feature vector based on the new code change and historical test case information, the historical test case information including information on code submissions rejected based on pre-submit tests and information on bug-inducing code changes based on post-submit tests. The computer program code further comprises sets of instruction to determine a ranking of a plurality of pre-submit tests using a learning algorithm by providing the feature vector to the learning algorithm. The computer program code further comprises sets of instruction to select one or more of the plurality of pre-submit tests based on the ranking to determine a set of selected pre-submit tests. The computer program code further comprises sets of instruction to test the new code change using the set of selected pre-submit tests to obtain pre-submit test results. The computer program code further comprises sets of instruction to determine an assessment of the new code change based on the pre-submit test results, the assessment indicating whether the new code change is accepted or rejected for submission to the source code repository. The computer program code further comprises sets of instruction to test new submitted source code stored in the source code repository using a set of post-submit tests to obtain post-submit test results, the new submitted source code including the new code change. The computer program code further comprises sets of instruction to update the learning algorithm based on the assessment of the new code change and the post-submit test results to obtain an updated learning algorithm.

The present disclosure provides a computer-implemented method, comprising obtaining a commit including a new code change that that is different compared to submitted source code stored in a source code repository. The method further comprises generating a feature vector based on the new code change and historical test case information, the historical test case information including information on code submissions rejected based on pre-submit tests and information on bug-inducing code changes based on post-submit tests. The method further comprises determining a ranking of a plurality of pre-submit tests using a learning algorithm by providing the feature vector to the learning algorithm. The method further comprises selecting one or more of the plurality of pre-submit tests based on the ranking to determine a set of selected pre-submit tests. The method further comprises testing the new code change using the set of selected pre-submit tests to obtain pre-submit test results. The method further comprises determining an assessment of the new code change based on the pre-submit test results, the assessment indicating whether the new code change is accepted or rejected for submission to the source code repository. The method further comprises testing new submitted source code stored in the source code repository using a set of post-submit tests to obtain post-submit test results, the new submitted source code including the new code change. The method further comprises updating the learning algorithm based on the assessment of the new code change and the post-submit test results to obtain an updated learning algorithm.

The following detailed description and accompanying drawings provide a better understanding of the nature and advantages of the present disclosure.

DETAILED DESCRIPTION

Figure 1:
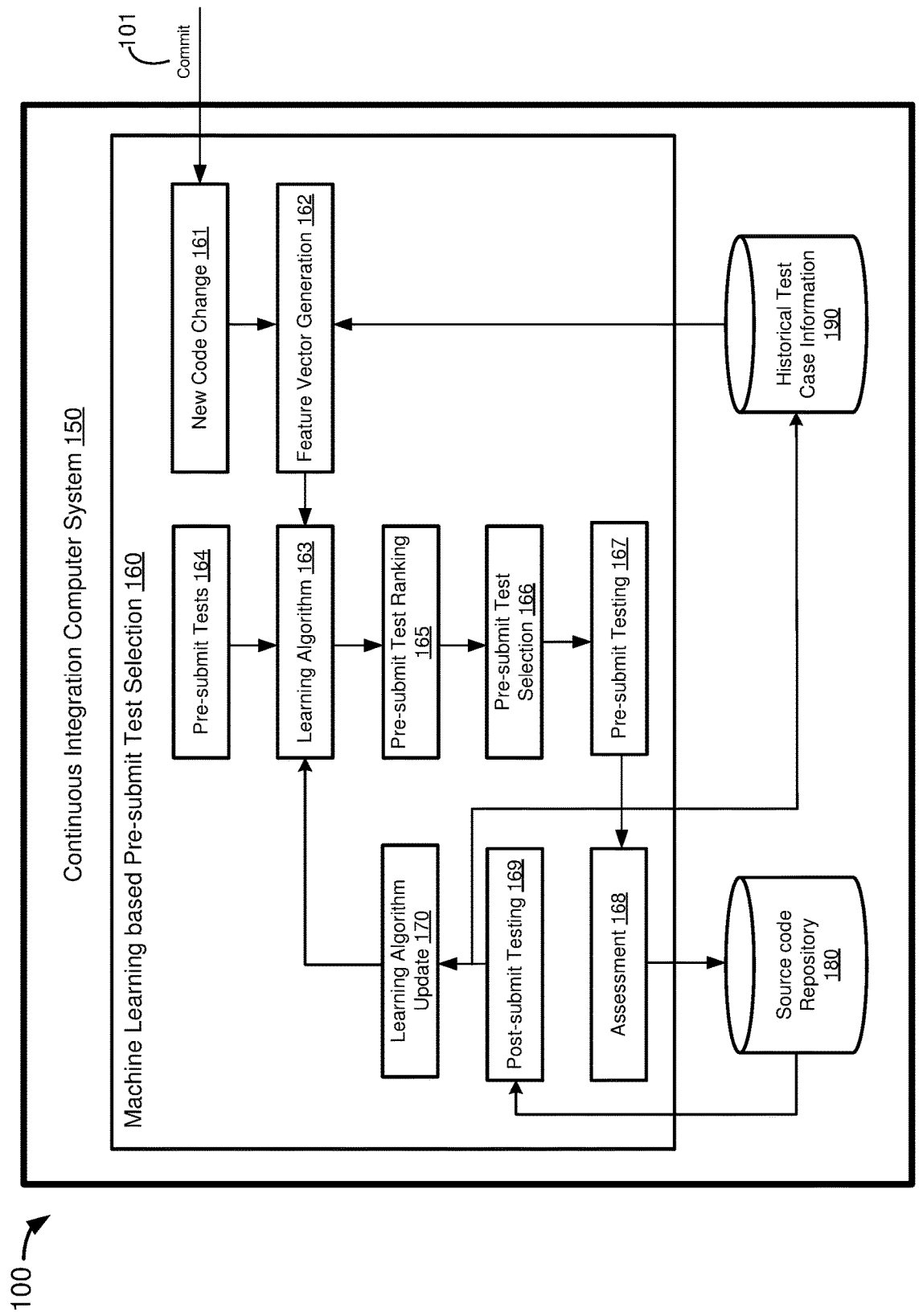
FIG. 1 shows a diagram of a continuous integration computer system implementing machine learning based pre-submit test selection, according to an embodiment.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

In the figures and their corresponding description, while certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. As used herein, the terms "first," "second," "third," "fourth," etc., do not necessarily indicate an ordering or sequence unless indicated and may instead be used for differentiation between different objects or elements.

As mentioned above, in some large-scale software projects regression test prioritization and selection is adapted to make continuous integration more reliable and practical. Machine Learning based test selection may be more efficient than static analysis-based test selection and may be more effective than dynamic analysis-based test selection using historical data. However, a reinforcement learning agent, like any other machine learning model, also requires "labeled" data to perform properly. In test selection, test case result history may be used as rejected test runs can be regarded as "should be selected" test cases. But not every test case may have historical records. In some cases, only a fixed set of test cases are executed as a regression test and a larger pool of test cases may be executed as post-submit tests regularly, such as daily, weekly, and so on.

One problem with this situation is that there can be faults in new source code changes that can only be detected by test cases in the larger test pool. And this cannot be used directly as training data for either the learn-to-rank models or the reinforcement learning agent to be able to catch them in the future, even if the faults are detected in the post-submit testing, because data labeling is not integrated into the continuous integration pipeline. For instance, it is not known which commit introduced a bug that caused tests in the larger test pool to fail. It would have been advantageous if that particular test had been selected to be performed on source code before it was integrated into the software.

The present disclosure provides techniques for machine learning based pre-submit test selection that addresses the above issues and others. A learning algorithm, such as a reinforcement learning algorithm or a learn-to-rank machine learning algorithm, is updated (e.g., trained) based on the results of both pre-submit tests and post-submit tests. In prior continuous integration systems for large software projects, test selection learning algorithms were not trained based on post-submit tests because the number of commits was too large to determine labels for continuous integration. As disclosed herein, bug-inducing commit detection techniques can be used to determine which commit introduced the bug that caused the post-submit tests to fail and this information can be used as labels for the learning algorithm. This is advantageous as test cases that would otherwise be part of post-submit testing can be performed as pre-submit tests, thereby preventing source code with bug from being submitted into a source code repository at all.

Machine learning based pre-submit test selection is further described below.

FIG. 1 shows a diagram 100 of a continuous integration computer system 150 implementing machine learning based pre-submit test selection 160, according to an embodiment. The continuous integration computer system 150 may include one or more computing machines such as server computers. The continuous integration computer system 150 may be part of a cloud computer system or part of an on-premise computer system, for example. The machine learning based pre-submit test selection 160 may be performed by software including a feature vector generation component 162, a learning algorithm 163, a pre-submit test selection component, a pre-submit testing component 167, an assessment component 168, a post-submit testing component 169, and a learning algorithm update component 170, which are discussed below. The continuous integration computer system 150 may also include a source code repository 180 and historical test case information 190, as further discussed below.

To perform machine learning based pre-submit test selection, the continuous integration computer system 150 first obtains a commit 101 including a new code change 161 that that is different compared to submitted source code stored in a source code repository 180.

The feature vector generation component 162 is configured to generate a feature vector based on the new code change 161 and historical test case information 190. The historical test case information 190 may include information on code submissions rejected based on pre-submit tests and it may include information on bug-inducing code changes based on post-submit tests.

The generated feature vector is provided to a learning algorithm 163 that is considered to determine a ranking 165 of a plurality of pre-submit tests 164. In some embodiments, the learning algorithm is a reinforcement learning algorithm or a learn-to-rank machine learning algorithm.

The pre-submit test selection component 166 is configured to select one or more of the plurality of pre-submit tests based on the ranking 165 output by the learning algorithm 163 to determine a set of selected pre-submit tests.

The pre-submit testing component 167 is configured to test the new code change 161 using the set of selected pre-submit tests, selected by the pre-submit test selection component 167, to obtain pre-submit test results.

The assessment component 168 is configured to determine an assessment of the new code change 161 based on the pre-submit test results from the pre-submit testing component 167. The assessment may indicate whether the new code change 161 is accepted or rejected for submission to the source code repository 180. If it is accepted, it is submitted to the source code repository 180. If it is rejected, it is not submitted. Information on other the new code change 161 was accepted or rejected and the results of the pre-submit tests may be stored as historical test case information 190.

Later, according to the time period set as part of continuous integration, the post-submit testing component 169 tests the new submitted source code stored in the source code repository 180 using a set of post-submit tests to obtain post-submit test results. The new submitted source code may include the new code change 161 if it was accepted according to the assessment.

In some embodiments a bug-inducing commit detection component (not shown in FIG. 1) may be configured to detect one or more bug-inducing commits including a bug-inducing commit for each failed post-submit test of the post-submit test results by bisecting a plurality of new commits. Each of the plurality of new commits may include new code changes submitted to the source code repository and included in the new submitted source code. In some embodiments, the detection of the one or more bug-inducing commits includes a determination of fault localization scores and a determination of a ranking based on the fault localization scores. In some embodiments, the determination of the fault localization scores is based on test case coverage.

The learning algorithm update component 170 may is configured to update the learning algorithm based on the assessment of the new code change and the post-submit test results to obtain an updated learning algorithm. In some embodiments, the update of the learning algorithm is further based on using the one or more bug-inducing commits as labeled data.

In some embodiments of the computer system, the updated learning algorithm is configured to determine a ranking of a second plurality of pre-submit tests, the second plurality of pre-submit tests including one or more tests from the set of post-submit tests.

Advantageously, the learning algorithm can be updated based on the results of both pre-submit testing and post-submit testing such that post-submit tests may be added to the pool of pre-submit tests, advantageously preventing bug-inducing code from being submitted to the source code repository.

Figure 2:
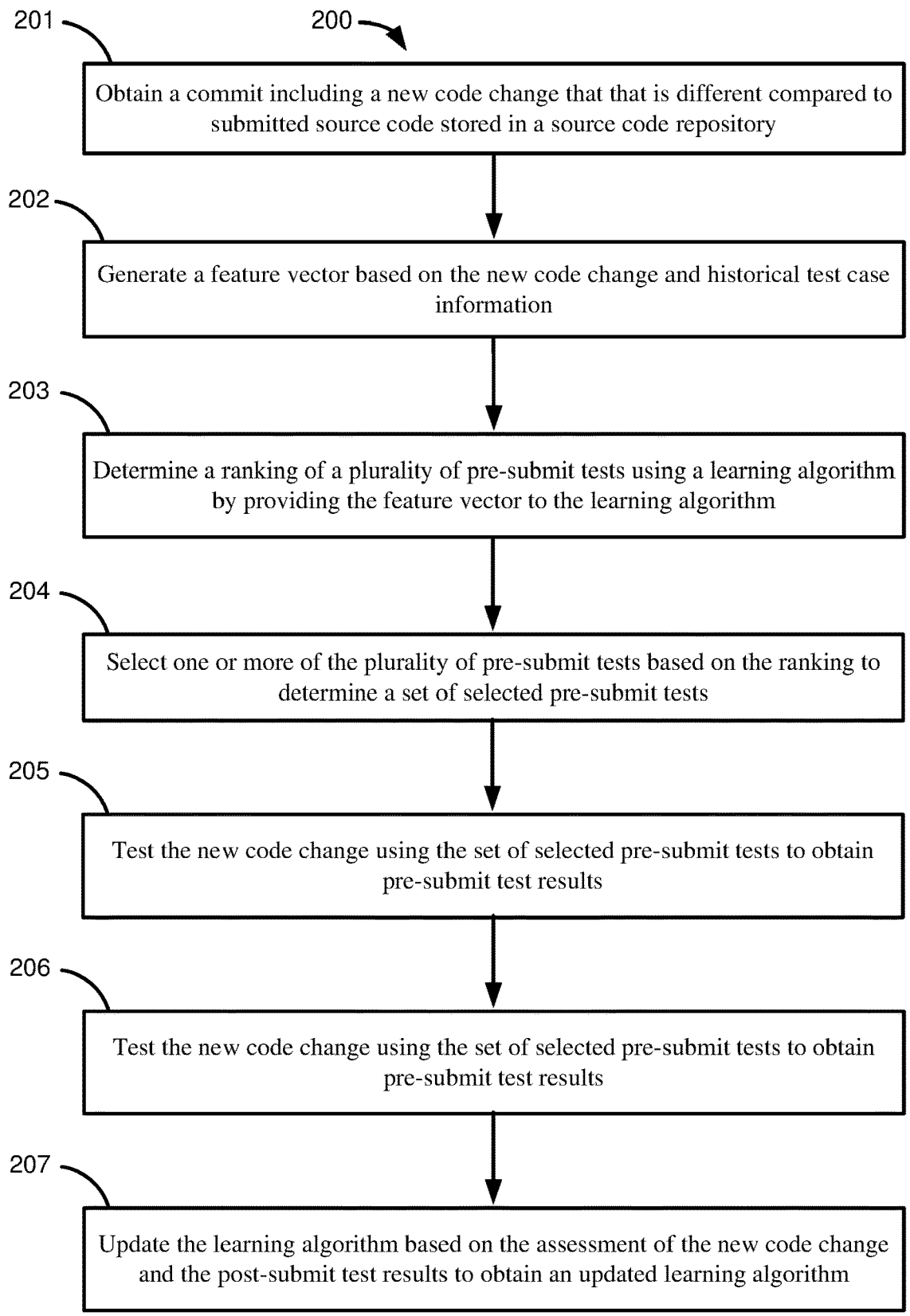
FIG. 2 shows a flowchart of a computer implemented method for pre-submit test selection, according to an embodiment.

FIG. 2 shows a flowchart 200 of a computer-implemented method for pre-submit test selection, according to an embodiment. The computer-implemented method may be performed by a computer system such as the continuous integration computer system 150 described above with respect to FIG. 1. The computer-implemented method may be performed using computer hardware such as the computer hardware described below with respect to FIG. 4. The ordering of the computer-implemented method may be modified unless otherwise noted.

At 201, obtain a commit including a new code change that that is different compared to submitted source code stored in a source code repository.

At 202, generate a feature vector based on the new code change and historical test case information, the historical test case information including information on code submissions rejected based on pre-submit tests and information on bug-inducing code changes based on post-submit tests.

At 203, determine a ranking of a plurality of pre-submit tests using a learning algorithm by providing the feature vector to the learning algorithm. In some embodiments, the learning algorithm is a reinforcement learning algorithm or a learn-to-rank machine learning algorithm.

At 204, select one or more of the plurality of pre-submit tests based on the ranking to determine a set of selected pre-submit tests.

At 205, test the new code change using the set of selected pre-submit tests to obtain pre-submit test results.

At 206, determine an assessment of the new code change based on the pre-submit test results, the assessment indicating whether the new code change is accepted or rejected for submission to the source code repository.

At 207, test new submitted source code stored in the source code repository using a set of post-submit tests to obtain post-submit test results, the new submitted source code including the new code change. In some embodiments, the method includes detecting one or more bug-inducing commits including a bug-inducing commit for each failed post-submit test of the post-submit test results by bisecting a plurality of new commits, each of the plurality of new commits including new code changes submitted to the source code repository and included in the new submitted source code. In some embodiments, the detection of the one or more bug-inducing commits includes a determination of fault localization scores and a determination of a ranking based on the fault localization scores. In some embodiments, the determination of the fault localization scores is based on test case coverage.

At 208, update the learning algorithm based on the assessment of the new code change and the post-submit test results to obtain an updated learning algorithm. In some embodiments, the update of the learning algorithm is further based on using the one or more bug-inducing commits as labeled data. In some embodiments, the updated learning algorithm is configured to determine a ranking of a second plurality of pre-submit tests, the second plurality of pre-submit tests including one or more tests from the set of post-submit tests.

Example Implementations

Example implementations of the techniques for machine learning based pre-submit test selection are described below.

As discussed above, one problem in prior continuous integration systems is that there can be faults in new source code changes that can only be detected by test cases in the larger post-submit test pool and this cannot be used directly as training data for either the learn-to-rank models or the reinforcement learning agent because data labeling is not integrated into the continuous integration pipeline. For instance, it is not known which commit introduced a bug that caused tests in the larger test pool to fail.

The techniques for machine learning based pre-submit testing described herein address these problems and others. One way that the problem is addressed is by using bug-inducing commit detection to for data labeling such that the faults in post-submit testing can be used as training data, as discussed below.

Figure 3:
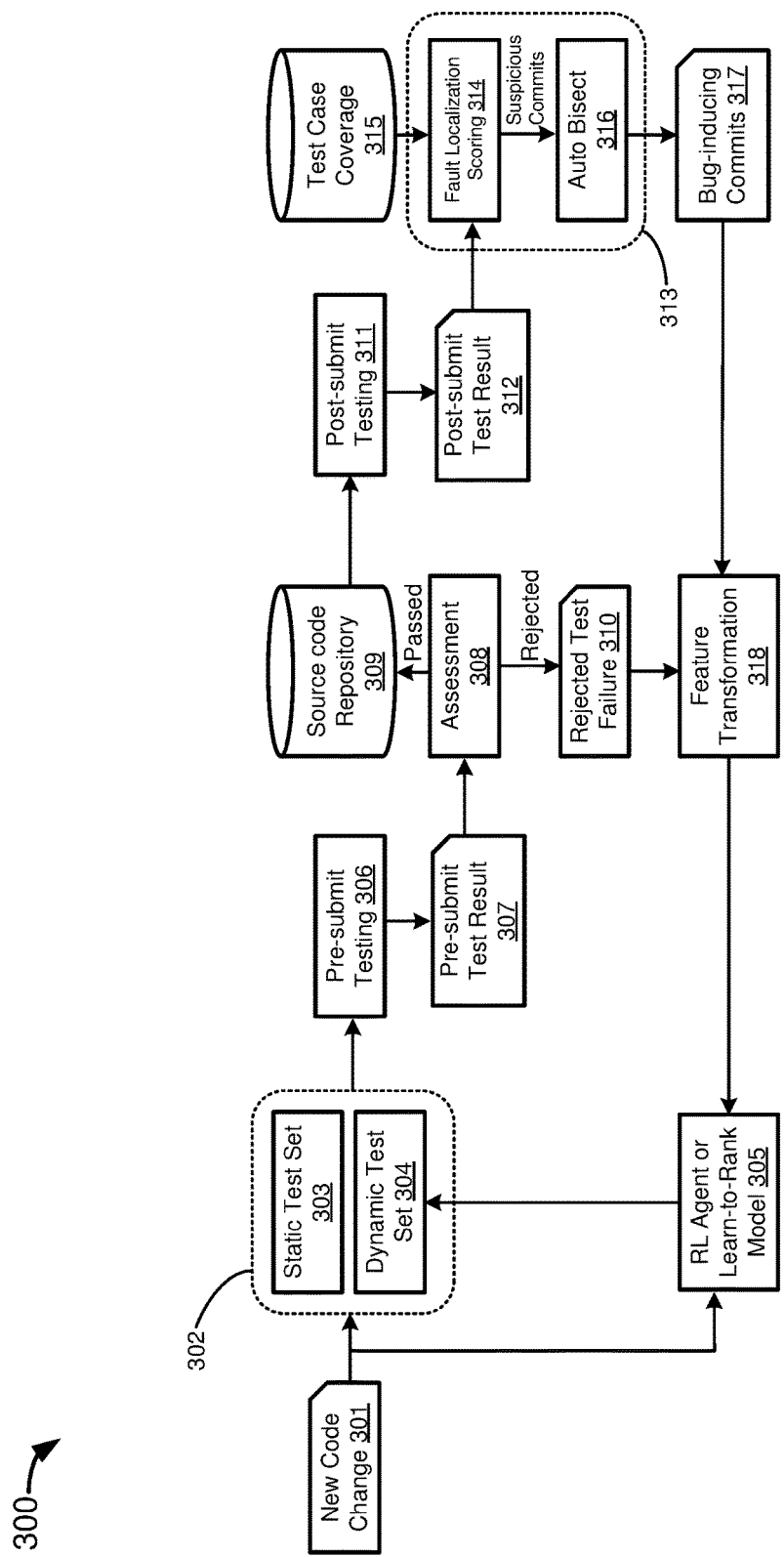
FIG. 3 shows a diagram of a continuous integration pipeline that uses the machine learning based pre-submit test selection using bug-inducing commit detection results as an input feed, according to an embodiment.

FIG. 3 shows a diagram 300 of a continuous integration pipeline that uses the machine learning based pre-submit test selection using bug-inducing commit detection results as an input feed, according to an embodiment.

First, a new code change 301 (e.g., as a "commit") is obtained and it is tested using a selected set of pre-submit test cases 302. The pre-submit tests cases include both a static test set 303 and a dynamic test set 304.

The static test set 303 may be a set of tests that is predetermined to be used for pre-submit testing. For instance, the static test set 303 may be predefined by developers considering its turnaround time and general effectiveness.

The dynamic test set 304 may be dynamically determined for a particular new code change by a reinforcement learning (RL) agent or by a learn-to rank machine learning (ML) model 305. The dynamic test set 304 may be determined when the new source code 161 is pushed and the reinforcement learning agent or the learn-to-rank model 305 may consumes a feature vector generated based on the new code change 301 and based on a test case history. In some embodiments the feature vector may be a vector comprising floating point value.

The RL agent or learn-to-rank model 305 may determine a set of dynamic test set cases 304 that are not included in the static test set 303 and which have higher ranks than a threshold rank.

The dynamic test set 304 may even be empty if the static test set 303 already contains all the required test cases and the RL agent or the ML model 305 does not determine any additional test cases above the threshold ranking.

Then pre-submit testing 306 is performed using the static test set 303 and the dynamic test set 304. Pre-submit test results 307 are obtained from the pre-submit testing 306.

Once the pre-submit testing 306 is finished, an automatic or manual assessment 308 is performed of the pre-submit test results 307 to determine whether the new source code change 301 can be merged into the source code repository 309.

If the new source code change 301 fails the assessment 308 (e.g., it is automatically rejected or manually rejected by a reviewer), the new source code change is rejected and it is not submitted to the source code repository.

If the source code change 301 is rejected, feature transformation 318 is performed. Feature transformation includes calculating a feature vector of each rejected test case. These calculated feature vectors provide labeled data for updating the reinforcement learning or learn-to-rank model 305 to enhance the precision of test prioritization and selection.

If the new source code change 301 passes the assessment 308, the new source code change 301 is submitted to the source code repository and is merged with the other source code stored in the source code repository 309.

In a daily manner, in general, continuous testing is performed, which includes post-submit testing 311. Post-submit test results 312 are obtained as a result of the post-submit testing.

Test case coverage 315 gets collected as well. In some cases with a larger time gap (e.g., twice a week). Test case coverage indicates which tests cover which program elements (e.g., source files, lines of code, or commits).

If a post-submit test case fails then bug-inducing commit detection 313 is performed to find the failed test case's bug-inducing commit using spectrum-based fault localization scoring 314 and ranking based on the scores, thereby identifying suspicious commits. To validate the suspiciousness scores, auto bisecting 316 is run to find the exact bug-inducing commits 317. In some embodiments, bug-inducing commit detection is only performed if the test cases continuously fails (e.g., without "flakiness").

Bug-inducing commit detection 313 is advantageous as it enabled labeled data for use in updating (e.g., training) the reinforcement learning agent or learn-to-rank model 305. To explain further, although there may not be a test case result history of every test case in "pre-submit" testing 306, the continuous integration pipeline may gather the data from post-submit testing 301 (e.g., the post-submit test result 312) to use as "labeled" data. The labels indicate which test cases should have blocked a change if it was selected and executed when the change was pushed. The labels can be determined using bisecting 316. Bisecting 316 is a process that performs binary search on a given range of commits and tries to find a first commit where a test case failure starts to appear.

Thus, bisecting 316 is useful to find the labelled data as a feed for the reinforcement learning agent or the machine learning model 305, as it provides a bug-inducing commit and test cases that would have found the defects. And, because this process provides deterministic results, it can be automated.

Some challenges here are that bug-inducing commit detection may be vulnerable towards "flaky" tests, and it may need to try too many times to reach the bug-inducing commit. That is, bisecting 316 may be ineffective with test flakiness, daily continuous runs may show prevalent flaky tests that fails non-deterministically. Moreover, some test cases, with not enough restart configuration, may fail once with other test cases and continue to succeed after. This inconsistent behavior makes the bisecting 317 hard and meaningless as it solely depends on deterministic test case results. As used herein, "flakiness" or "flaky" test results refers to non-deterministic test results. For example, if source code is the same and unchanged but the test results for that code are different, the test may be referred to as "flaky" because of the randomness in the result. It may be advantageous to filter the "flakiness" from the post-submit test results, to ignore those test results. However, if the test failure is consistent (e.g., not "flaky") then it is not ignored. The event border between flaky results and consistent results can be determined and the flaky results may be determined.

In some cases, the bug-inducing commit process may try 3+|log 2N| times to find the root cause commit, where N is the number of commits. This additional test execution with different versions of the software may not be costly with a small number of commits. But in a large-scale software system that is being contributed by hundreds of developers, this number may not be something ignorable. Nevertheless, the bug-inducing commit detection can be enhanced by fault localization scoring 314 and ranking based on the scores.

Once the bug-inducing commit 317 is found, the feature transformation 318 is performed, calculating a feature vector of the rejected test failure 310 and the bug-inducing commit 317 and provides it as an input feed of the reinforcement learning agent or the learn-to-rank model 305 for pre-submit test selection Advantageously, the learning algorithm can be updated based on the results of both pre-submit testing and post-submit testing such that post-submit tests may be added to the pool of pre-submit tests, advantageously preventing bug-inducing code from being submitted to the source code repository.

Figure 4:
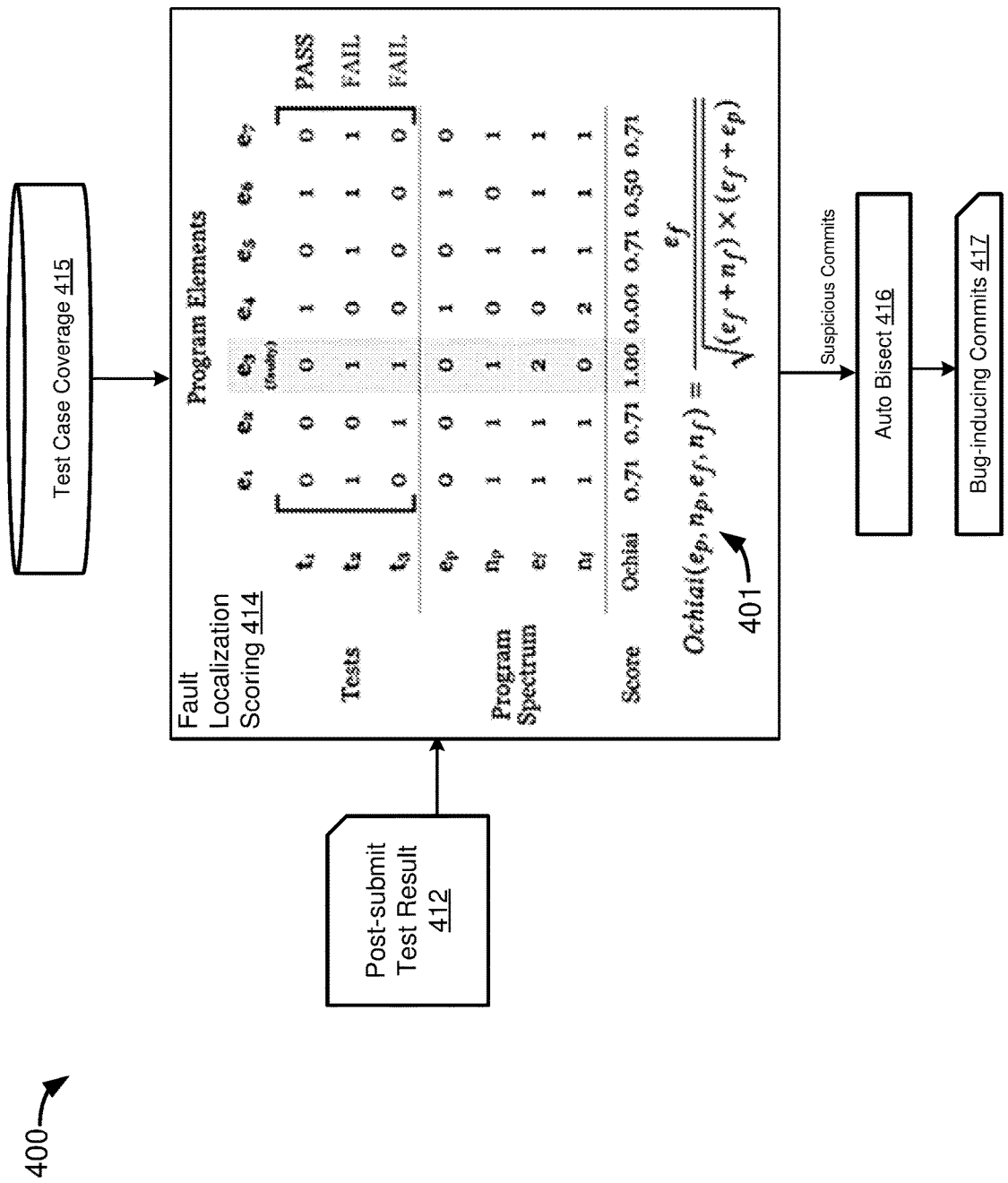
FIG. 4 shows a diagram of fault localization scoring for initiating bisecting, according to an embodiment.

FIG. 4 shows a diagram 400 of fault localization scoring for initiating bisecting, according to an embodiment. The diagram 400 of FIG. 4 includes some of the same elements described above with respect to the diagram 300 of FIG. 3 and these elements may be configured similarly.

As mentioned above, continuous testing (e.g., daily) is performed, which includes post-submit testing to determine post-submit test results 412 (see also 312 in FIG. 3). If a post-submit test case fails then bug-inducing commit detection is performed to find the failed test case's bug-inducing commit using spectrum-based fault localization scoring 414 (see also 314 in FIG. 3) and ranking based on the scores, thereby identifying suspicious commits. To validate the suspiciousness scores, auto bisecting 416 (see also 316 in FIG. 3) is run to find the exact bug-inducing commits 417.

As also mentioned above, test case coverage 415 (see also 315 in FIG. 3) gets collected. In some cases with a larger time gap (e.g., twice a week). Test case coverage indicates which tests cover which program elements (e.g., source files, lines of code, or commits).

The fault localization scoring 414 functionality uses the test case coverage 415 and the post-submit test results 412 to determine which commits to test first when performing the auto bisect 416 for each test case. That is, the output of the fault localization scoring 414 is a set of suspicious commits, one for each test case, and the auto-bisecting 416 functionality tests these suspicious commits first when bisecting rather than starting with a normal binary search. Starting using the suspicious commits is advantageous as it may reduce the number of bisects, and so the number of tests that need to be performed, when bisecting to determine which commit was the commit that introduced the bug that caused the particular test to fail. This advantageously reduces the amount of computing resources used in performing the bisect 416.

Fault localization scoring 414 determines which commit are suspicious. In fault localization scoring, the more frequently covered by failing tests and the less frequently covered by passing tests, the more suspicious a program element (e.g., commit) is.

The test coverage data 415 is referenced by the fault localization scoring functionality 414. As shown in the example of FIG. 4, there are seven program elements (e.g., commits) $e_1$, $e_2$, $e_3$, $e_4$, $e_5$, $e_6$, and $e_7$, and three test $t_1$, $t_2$, and $t_3$. As indicated by the 0s and 1s test case coverage (shown in the upper portion of fault localization scoring 414), test $t_1$ covers program elements $e_5$ and $e_6$, test $t_2$ covers program elements $e_1$ and $e_3$, and test $t_2$ covers program elements $e_2$ and $e_3$, where test $t_1$ passed and tests $t_2$ and $t_3$ failed.

In some embodiments the fault localization scoring 414 may be spectrum based fault localization scoring. In some embodiments the fault localization scoring 414 may use the Ochiai formula 401 to determine suspicious program elements. The ochiai formula 401 uses counter values where $e_p$ counts program elements executed by passed test case, $n_p$ counts program elements not executed by passed test case, $e_f$ counts program elements executed by failed test case, and $n_f$ counts program elements not executed by failed test case.

As indicated by the 0s and 1s in the Program Spectrum portion of fault localization scoring 414 in FIG. 4, program element $e_1$, was not executed by a passed test case (e.g., not executed by test $t_1$), was executed by a failed test case (e.g., $t_2$) and was not executed by a failed test case (e.g., $t_3$). Program element $e_2$, was not executed by a passed test case (e.g., $t_1$), was executed by a failed test case (e.g., $t_3$) and was not executed by a failed test case (e.g., $t_2$). Program element $e_3$, which is the most suspicious program element in this example (e.g., it is suspected to be faulty and have introduced the bug causing the test to fail) was not executed by a passed test case (e.g., $t_1$), was executed by two failed test case (e.g., both $t_2$ and $t_3$) and it is also not the case that it was not executed by a failed test case (e.g., it was executed by all failed test cases). Program element $e_4$, was executed by a passed test case (e.g., $t_1$), was not executed by a failed test case (e.g., it was not executed by $t_2$ or $t_3$). Program element $e_5$, was not executed by a passed test case (e.g., $t_1$) and it was executed by a failed test case (e.g., $t_2$). Program element $e_6$, was executed by a passed test case (e.g., $t_1$), and it was also executed by a failed test case (e.g., $t_2$). Program element $e_7$, was not executed by a passed test case (e.g., $t_1$) and it was executed by a failed test case (e.g., $t_2$).

Using the ochiai formula and these counters, the ochiai value (which higher values indicate higher suspiciousness of the program elements/commits) are 0.71 for $e_1$, 0.71 for $e_2$, 1.00 for $e_3$, 0.00 for $e_4$, 0.71 for $e_5$, 0.50 for $e_6$, and 0.71 for $e_7$ Accordingly, program element $e_3$ has the highest ochiai value and is the most suspicious program element (commit) for failing test cases $t_2$ and $t_3$. That is, the ochiai scores of program elements that each commit contains are summed and the commits are ranked based on the aggregated values.

Example Hardware

Figure 5:
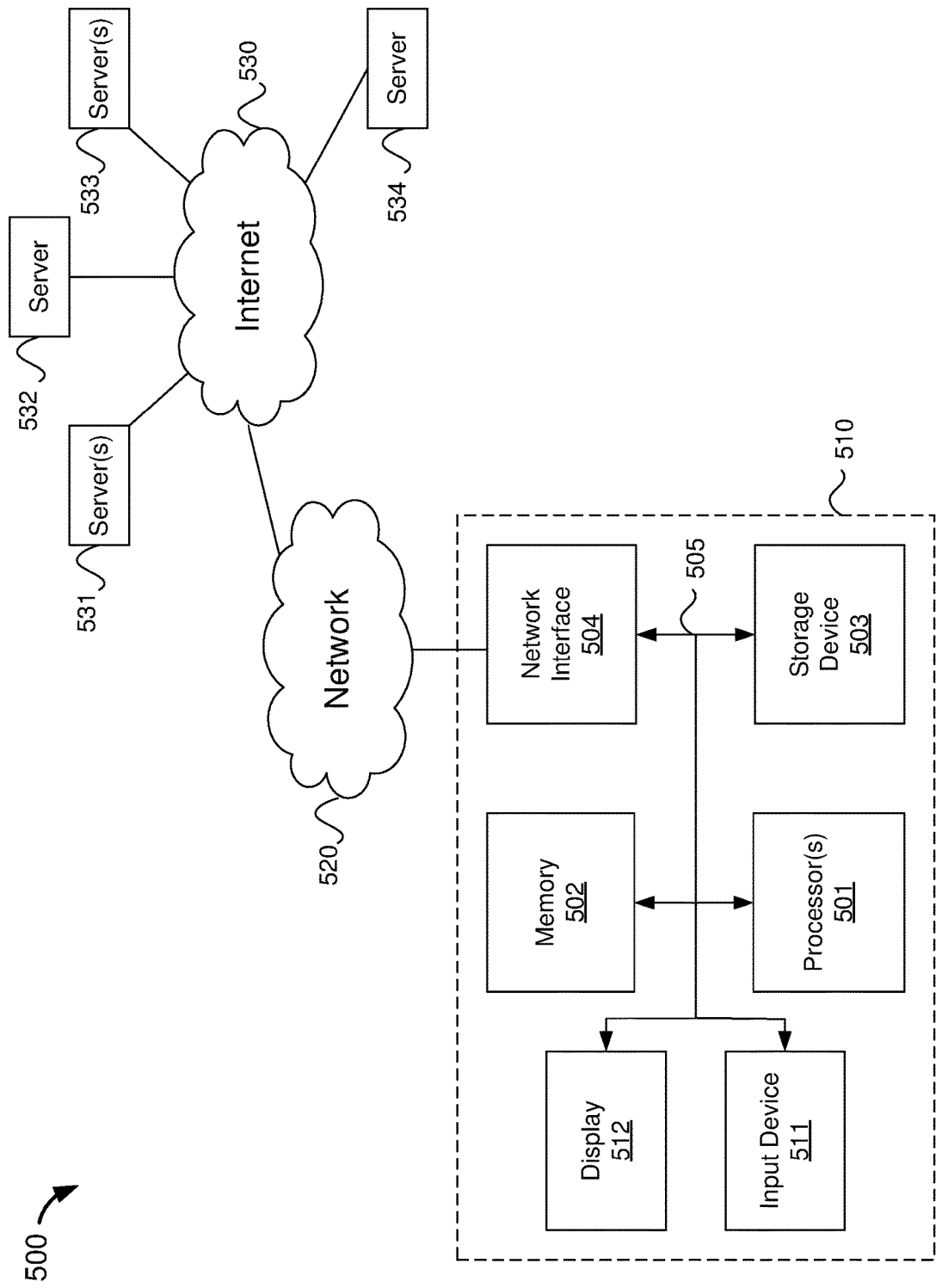
FIG. 5 shows a diagram of hardware of a special purpose computing machine for implementing systems and methods described herein.

FIG. 5 shows a diagram of hardware of a special purpose computing machine for implementing the systems and methods described herein. The following hardware description is merely one example. It is to be understood that a variety of computers topologies may be used to implement the above described techniques. For instance, the computer system may implement the computer implemented method described.

An example computer system 510 is illustrated in FIG. 5. Computer system 510 includes a bus 505 or other communication mechanism for communicating information, and one or more processor(s) 501 coupled with bus 505 for processing information. Computer system 510 also includes a memory 502 coupled to bus 505 for storing information and instructions to be executed by processor 501, including information and instructions for performing some of the techniques described above, for example. This memory may also be used for storing programs executed by processor(s) 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 503 may include source code, binary code, or software files for performing the techniques above, for example. Storage device and memory are both examples of non-transitory computer readable storage mediums. For example, the storage device 503 may store computer program code including instructions for implementing the method described above with respect to FIG. 2.

Computer system 510 may be coupled using bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses, for example.

Computer system also includes a network interface 504 coupled with bus 505. Network interface 504 may provide two-way data communication between computer system 510 and a network 520. The network interface 504 may be a wireless or wired connection, for example. Computer system 510 can send and receive information through the network interface 504 across a local area network, an Intranet, a cellular network, or the Internet, for example. In the Internet example, a browser, for example, may access data and features on backend systems that may reside on multiple different hardware servers 531, 532, 533, 534 across the network. The servers 531-534 may be part of a cloud computing environment, for example.

Example Embodiments

Example embodiments of the techniques for machine learning based pre-submit test section are given below.

Some embodiments provide a computer system. The computer system includes one or more processors and one or more machine-readable medium coupled to the one or more processors. The one or more machine-readable medium store computer program code comprising sets instructions. The instructions are executable by the one or more processors to obtain a commit including a new code change that is different compared to submitted source code stored in a source code repository. The instructions are further executable to generate a feature vector based on the new code change and historical test case information, the historical test case information including information on code submissions rejected based on pre-submit tests and information on bug-inducing code changes based on post-submit tests. The instructions are further executable to determine a ranking of a plurality of pre-submit tests using a learning algorithm by providing the feature vector to the learning algorithm. The instructions are further executable to select one or more of the plurality of pre-submit tests based on the ranking to determine a set of selected pre-submit tests. The instructions are further executable to test the new code change using the set of selected pre-submit tests to obtain pre-submit test results. The instructions are further executable to determine an assessment of the new code change based on the pre-submit test results, the assessment indicating whether the new code change is accepted or rejected for submission to the source code repository. The instructions are further executable to test new submitted source code stored in the source code repository using a set of post-submit tests to obtain post-submit test results, the new submitted source code including the new code change. The instructions are further executable to update the learning algorithm based on the assessment of the new code change and the post-submit test results to obtain an updated learning algorithm.

In some embodiments of the computer system, the computer program code further comprises sets of instructions executable by the one or more processors to detect one or more bug-inducing commits including a bug-inducing commit for each failed post-submit test of the post-submit test results by bisecting a plurality of new commits, each of the plurality of new commits including new code changes submitted to the source code repository and included in the new submitted source code.

In some embodiments of the computer system, the update of the learning algorithm is further based on using the one or more bug-inducing commits as labeled data.

In some embodiments of the computer system, the detection of the one or more bug-inducing commits includes a determination of fault localization scores and a determination of a ranking based on the fault localization scores.

In some embodiments of the computer system, the determination of the fault localization scores is based on test case coverage.

In some embodiments of the computer system, the updated learning algorithm is configured to determine a ranking of a second plurality of pre-submit tests, the second plurality of pre-submit tests including one or more tests from the set of post-submit tests.

In some embodiments of the computer system, the learning algorithm is a reinforcement learning algorithm or a learn-to-rank machine learning algorithm.

Some embodiments provide one or more non-transitory computer-readable medium storing computer program code comprising sets of instructions to obtain a commit including a new code change that that is different compared to submitted source code stored in a source code repository. The computer program code further comprises sets of instruction to generate a feature vector based on the new code change and historical test case information, the historical test case information including information on code submissions rejected based on pre-submit tests and information on bug-inducing code changes based on post-submit tests. The computer program code further comprises sets of instruction to determine a ranking of a plurality of pre-submit tests using a learning algorithm by providing the feature vector to the learning algorithm. The computer program code further comprises sets of instruction to select one or more of the plurality of pre-submit tests based on the ranking to determine a set of selected pre-submit tests. The computer program code further comprises sets of instruction to test the new code change using the set of selected pre-submit tests to obtain pre-submit test results. The computer program code further comprises sets of instruction to determine an assessment of the new code change based on the pre-submit test results, the assessment indicating whether the new code change is accepted or rejected for submission to the source code repository. The computer program code further comprises sets of instruction to test new submitted source code stored in the source code repository using a set of post-submit tests to obtain post-submit test results, the new submitted source code including the new code change. The computer program code further comprises sets of instruction to update the learning algorithm based on the assessment of the new code change and the post-submit test results to obtain an updated learning algorithm.

In some embodiments of the non-transitory computer-readable medium, the computer program code further comprises sets of instructions to detect one or more bug-inducing commits including a bug-inducing commit for each failed post-submit test of the post-submit test results by bisecting a plurality of new commits, each of the plurality of new commits including new code changes submitted to the source code repository and included in the new submitted source code.

In some embodiments of the non-transitory computer-readable medium, the update of the learning algorithm is further based on using the one or more bug-inducing commits as labeled data.

In some embodiments of the non-transitory computer-readable medium, the detection of the one or more bug-inducing commits includes a determination of fault localization scores and a determination of a ranking based on the fault localization scores.

In some embodiments of the non-transitory computer-readable medium, the determination of the fault localization scores is based on test case coverage.

In some embodiments of the non-transitory computer-readable medium, the updated learning algorithm is configured to determine a ranking of a second plurality of pre-submit tests, the second plurality of pre-submit tests including one or more tests from the set of post-submit tests.

In some embodiments of the non-transitory computer-readable medium, the learning algorithm is a reinforcement learning algorithm or a learn-to-rank machine learning algorithm.

Some embodiments provide a computer-implemented method, comprising obtaining a commit including a new code change that that is different compared to submitted source code stored in a source code repository. The method further comprises generating a feature vector based on the new code change and historical test case information, the historical test case information including information on code submissions rejected based on pre-submit tests and information on bug-inducing code changes based on post-submit tests. The method further comprises determining a ranking of a plurality of pre-submit tests using a learning algorithm by providing the feature vector to the learning algorithm. The method further comprises selecting one or more of the plurality of pre-submit tests based on the ranking to determine a set of selected pre-submit tests. The method further comprises testing the new code change using the set of selected pre-submit tests to obtain pre-submit test results. The method further comprises determining an assessment of the new code change based on the pre-submit test results, the assessment indicating whether the new code change is accepted or rejected for submission to the source code repository. The method further comprises testing new submitted source code stored in the source code repository using a set of post-submit tests to obtain post-submit test results, the new submitted source code including the new code change. The method further comprises updating the learning algorithm based on the assessment of the new code change and the post-submit test results to obtain an updated learning algorithm.

In some embodiments of the computer-implemented method, it further comprises detecting one or more bug-inducing commits including a bug-inducing commit for each failed post-submit test of the post-submit test results by bisecting a plurality of new commits, each of the plurality of new commits including new code changes submitted to the source code repository and included in the new submitted source code.

In some embodiments of the computer-implemented method, the update of the learning algorithm is further based on using the one or more bug-inducing commits as labeled data.

In some embodiments of the computer-implemented method, the detection of the one or more bug-inducing commits includes a determination of fault localization scores and a determination of a ranking based on the fault localization scores.

In some embodiments of the computer-implemented method, the determination of the fault localization scores is based on test case coverage.

In some embodiments of the computer-implemented method, the updated learning algorithm is configured to determine a ranking of a second plurality of pre-submit tests, the second plurality of pre-submit tests including one or more tests from the set of post-submit tests.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations, and equivalents may be employed without departing from the scope of the present disclosure as defined by the claims.

What is claimed is:

1. A computer system, comprising:
one or more processors; and
one or more machine-readable medium coupled to the one or more processors and storing computer program code comprising sets of instructions executable by the one or more processors to:
obtain a commit including a new code change that that is different compared to submitted source code stored in a source code repository;
generate a feature vector based on the new code change and historical test case information, the historical test case information including information on code submissions rejected for submission to the source code repository based on pre-submit tests and information on bug-inducing code changes based on post-submit tests, the feature vector providing labeled data for the bug-inducing code changes;
determine a ranking of a plurality of pre-submit tests using a learning algorithm by providing the feature vector to the learning algorithm;
select one or more of the plurality of pre-submit tests based on the ranking to determine a set of selected pre-submit tests;
test the new code change using the set of selected pre-submit tests to obtain pre-submit test results;
determine an assessment of the new code change based on the pre-submit test results, the assessment indicating whether the new code change is accepted or rejected for submission to the source code repository;
test new submitted source code submitted to the source code repository and merged with other source code stored in the source code repository using a set of post-submit tests to obtain post-submit test results, the new submitted source code including the new code change; and update the learning algorithm based on the assessment of the new code change and the post-submit test results to obtain an updated learning algorithm.

2. The computer system of claim 1, wherein the computer program code further comprises sets of instructions executable by the one or more processors to:
  detect one or more bug-inducing commits including a bug-inducing commit for each failed post-submit test of the post-submit test results by bisecting a plurality of new commits, each of the plurality of new commits including new code changes submitted to the source code repository and included in the new submitted source code.

3. The computer system of claim 2, wherein the update of the learning algorithm is further based on using the one or more bug-inducing commits as labeled data.

4. The computer system of claim 2, wherein the detection of the one or more bug-inducing commits includes a determination of fault localization scores and a determination of a ranking based on the fault localization scores.

5. The computer system of claim 4, wherein the determination of the fault localization scores is based on test case coverage.

6. The computer system of claim 1, wherein the updated learning algorithm is configured to determine a ranking of a second plurality of pre-submit tests, the second plurality of pre-submit tests including one or more tests from the set of post-submit tests.

7. The computer system of claim 1, wherein the learning algorithm is a reinforcement learning algorithm or a learn-to-rank machine learning algorithm.

8. One or more non-transitory computer-readable medium storing computer program code comprising sets of instructions to:
  obtain a commit including a new code change that that is different compared to submitted source code stored in a source code repository;
  generate a feature vector based on the new code change and historical test case information, the historical test case information including information on code submissions rejected for submission to the source code repository based on pre-submit tests and information on bug-inducing code changes based on post-submit tests, the feature vector providing labeled data for the bug-inducing code changes;
  determine a ranking of a plurality of pre-submit tests using a learning algorithm by providing the feature vector to the learning algorithm;
  select one or more of the plurality of pre-submit tests based on the ranking to determine a set of selected pre-submit tests;
  test the new code change using the set of selected pre-submit tests to obtain pre-submit test results;
  determine an assessment of the new code change based on the pre-submit test results, the assessment indicating whether the new code change is accepted or rejected for submission to the source code repository;
  test new submitted source code submitted to the source code repository and merged with other source code stored in the source code repository using a set of post-submit tests to obtain post-submit test results, the new submitted source code including the new code change; and
  update the learning algorithm based on the assessment of the new code change and the post-submit test results to obtain an updated learning algorithm.

9. The non-transitory computer-readable medium of claim 8, wherein the computer program code further comprises sets of instructions to:
  detect one or more bug-inducing commits including a bug-inducing commit for each failed post-submit test of the post-submit test results by bisecting a plurality of new commits, each of the plurality of new commits including new code changes submitted to the source code repository and included in the new submitted source code.

10. The non-transitory computer-readable medium of claim 9, wherein the update of the learning algorithm is further based on using the one or more bug-inducing commits as labeled data.

11. The non-transitory computer-readable medium of claim 9, wherein the detection of the one or more bug-inducing commits includes a determination of fault localization scores and a determination of a ranking based on the fault localization scores.

12. The non-transitory computer-readable medium of claim 11, wherein the determination of the fault localization scores is based on test case coverage.

13. The non-transitory computer-readable medium of claim 8, wherein the updated learning algorithm is configured to determine a ranking of a second plurality of pre-submit tests, the second plurality of pre-submit tests including one or more tests from the set of post-submit tests.

14. The non-transitory computer-readable medium of claim 8, wherein the learning algorithm is a reinforcement learning algorithm or a learn-to-rank machine learning algorithm.

15. A computer-implemented method, comprising:
  obtaining a commit including a new code change that that is different compared to submitted source code stored in a source code repository;
  generating a feature vector based on the new code change and historical test case information, the historical test case information including information on code submissions rejected for submission to the source code repository based on pre-submit tests and information on bug-inducing code changes based on post-submit tests, the feature vector providing labeled data for the bug-inducing code changes;
  determining a ranking of a plurality of pre-submit tests using a learning algorithm by providing the feature vector to the learning algorithm;
  selecting one or more of the plurality of pre-submit tests based on the ranking to determine a set of selected pre-submit tests;
  testing the new code change using the set of selected pre-submit tests to obtain pre-submit test results;
  determining an assessment of the new code change based on the pre-submit test results, the assessment indicating whether the new code change is accepted or rejected for submission to the source code repository;
  testing new submitted source code submitted to the source code repository and merged with other source code stored in the source code repository using a set of post-submit tests to obtain post-submit test results, the new submitted source code including the new code change; and
  updating the learning algorithm based on the assessment of the new code change and the post-submit test results to obtain an updated learning algorithm.

16. The computer-implemented method of claim 15, further comprising:

detecting one or more bug-inducing commits including a bug-inducing commit for each failed post-submit test of the post-submit test results by bisecting a plurality of new commits, each of the plurality of new commits including new code changes submitted to the source code repository and included in the new submitted source code.

17. The computer-implemented method of claim 16, wherein the update of the learning algorithm is further based on using the one or more bug-inducing commits as labeled data.

18. The computer-implemented method of claim 16, wherein the detection of the one or more bug-inducing commits includes a determination of fault localization scores and a determination of a ranking based on the fault localization scores.

19. The computer-implemented method of claim 15, wherein the detection of the one or more bug-inducing commits includes a determination of fault localization scores and a determination of a ranking based on the fault localization scores, and wherein the determination of the fault localization scores is based on test case coverage.

20. The computer-implemented method of claim 15, wherein the updated learning algorithm is configured to determine a ranking of a second plurality of pre-submit tests, the second plurality of pre-submit tests including one or more tests from the set of post-submit tests.

* * * * *